United States Patent [19]

Rutten

[11] 4,086,881

[45] May 2, 1978

[54] ROTARY ENGINE

[75] Inventor: Jean J. Rutten, Liege, Belgium

[73] Assignee: Fabrique Nationale Herstal S.A., en abrege FN, Herstal, Belgium

[21] Appl. No.: 702,681

[22] Filed: Jul. 6, 1976

[30] Foreign Application Priority Data

Aug. 5, 1975 Belgium ............................ 832139

[51] Int. Cl.² ........................................ F02B 53/00
[52] U.S. Cl. .................................. 123/228; 123/229; 418/188; 418/243
[58] Field of Search ............... 123/8.27, 8.31, 8.33, 123/8.49; 418/183, 188, 244, 245, 243

[56] References Cited

U.S. PATENT DOCUMENTS

| 976,691 | 11/1910 | Prall | 123/8.31 |
|---|---|---|---|
| 1,106,882 | 8/1914 | Mathiesen | 418/183 X |
| 1,637,958 | 8/1927 | Newson | 123/8.27 |
| 2,070,631 | 2/1937 | Sunderland | 123/8.27 |
| 2,130,054 | 9/1938 | Whitfield | 418/183 |
| 3,439,582 | 4/1969 | Smith | 418/245 |
| 3,739,754 | 6/1973 | Nutku | 418/188 X |

FOREIGN PATENT DOCUMENTS

| 496,590 | 11/1930 | Germany | 123/8.33 |
|---|---|---|---|
| 334,819 | 9/1930 | United Kingdom | 123/8.49 |

*Primary Examiner*—Carlton R. Croyle
*Assistant Examiner*—Michael Koczo, Jr.
*Attorney, Agent, or Firm*—Bacon & Thomas

[57] ABSTRACT

The invention pertains to a rotary engine characterized by the fact that it consists of a cylindrical outer shell and of a concentric internal cylindrical body, between which operates a coaxial rotary piston which is also cylindrical, and of a chamber for air or carburetted fuel mixture under pressure, for feeding the engine.

3 Claims, 18 Drawing Figures

ROTARY ENGINE

The present invention relates to a rotary engine, of which the combustion process may be of the Diesel type, the internal combustion engine type or the gas engine type. It also relates to a rotary compressor.

The main difficulty of the existing rotary engines concerns their sealing. In all rotary engines designed and built up till now, the rotary pistons move within spaces which are not surfaces of revolution. The seals are obliged to follow the profile of the space. It is easy to understand that the further the shape departs from that of a cylinder, the more difficult the sealing becomes. One purpose of the invention is to make the container perfectly cylindrical, which will markedly simplify the problem of the seals.

On the other hand, in conventional engines of the two or four stroke type which use the crank and connecting rod system, there is always a shift of phase between the moment when combustion takes place and the moment when the energy released by the combustion can be collected, which is inherent to the crank and connecting rod system. In other words, at the instant when the combustion takes place, the pressure upon the piston is maximum and the connecting rod is practically in straight line extension of the crank; therefore the engine torque is practically nil. In the rotary engine according to the application, on the other hand, as soon as the combustion (explosion) takes place, engine torque is available and this torque depends exclusively upon the thermodynamical laws of gasses. A very great flexibility is therefore to be expected from this rotary engine.

A rotary engine built according to the invention is characterized by the fact that it consists of an outer cylindrical shell and of an internal cylindrical body which is concentric with the shell, between both of which moves a coaxial rotary piston which is also cylindrical, and of a chamber for combustion gas or carburetted fuel mixture under pressure, for feeding the engine.

In accordance with a favourable form of embodiment of the invention, the internal body is made hollow and serves as chamber for air or carburetted fuel mixture under pressure.

According to the invention, the gas pressure in the chamber for air or carburetted fuel mixture under pressure is obtained by the transfer to aforesaid chamber of gas charges which have been compressed by the rotary piston in the course of its cycle, which is similar to the 4 stroke cycle, aforesaid chamber restoring the air or carburetted gas before the combustion takes place.

Further according to the invention, the rotary piston of cylindrical shape appears as follows: at least two longitudinal branches located like generatrices of the cylinder and joined together by two flanges, one of which is extended for power take-off.

In view of a better comprehension of the invention, the latter will now be described, merely as an example, with reference to the appended drawings in which.

Figure 1:
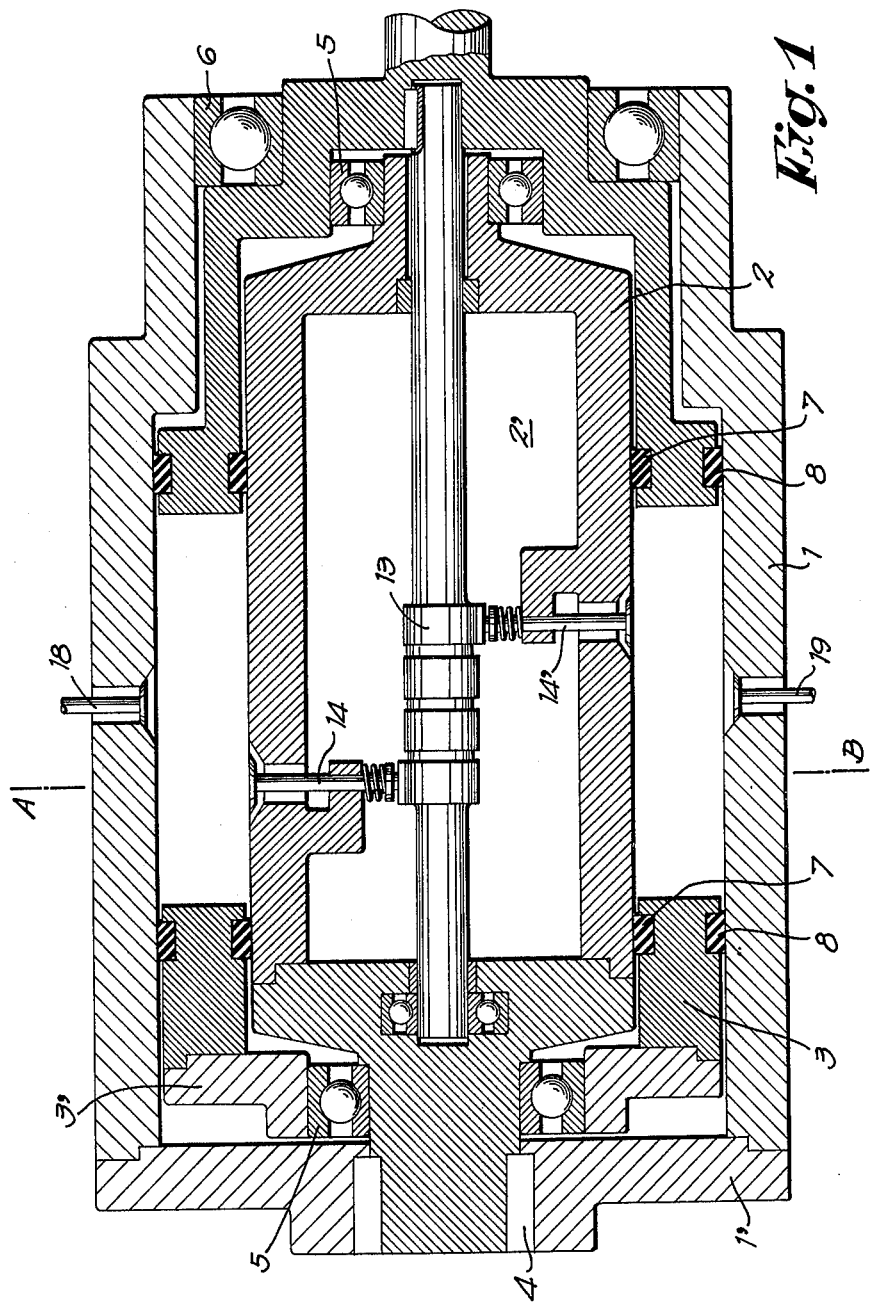
FIG. 1 is a longitudinal section of a rotary engine built according to the invention, along the broken line CDEFGH in FIG. 2.
Figure 2:
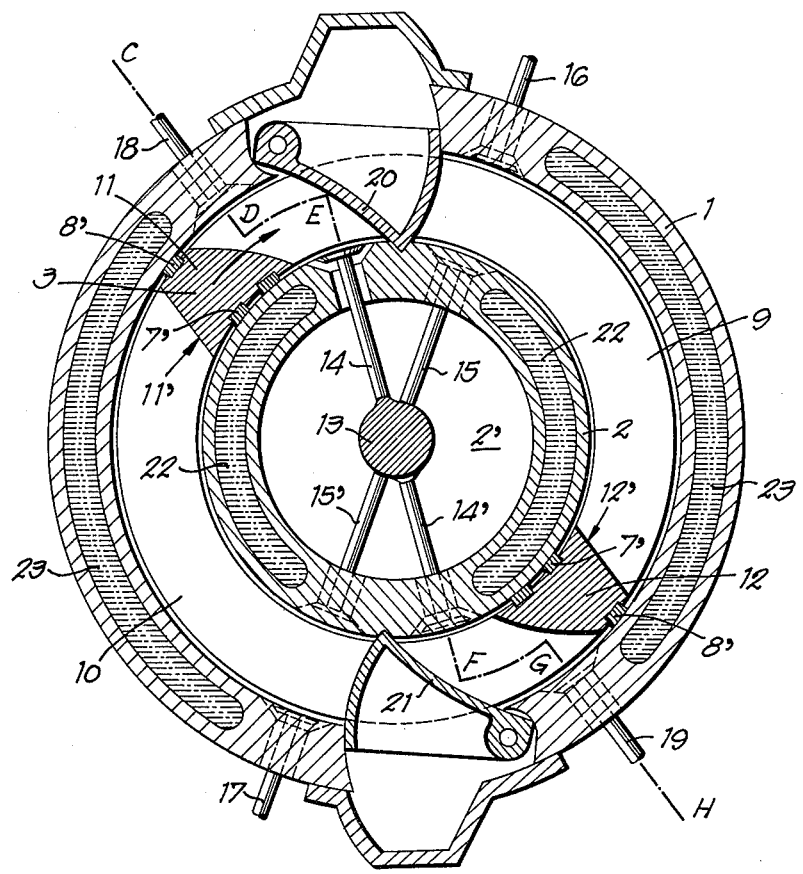
FIG. 2 is a cross-section of the engine of FIG. 1, according to line AB in FIG. 1.

As can be seen in the drawings of FIGS. 1 and 2, a rotary engine according to the invention is made up of an outer cylindrical shell 1 which encloses an also cylindrical coaxial hollow body 2, and between this shell and this hollow body a rotary piston 3, also of cylindrical and hollow shape, is fitted so as to be able to rotate around the common axis of the assembly.

Outer shell 1 with its cover 1' and the inner hollow body 2 are solidly joined together by means of two keys 4. The rotary piston 3 is journalled on the hollow body by means of ball bearings or suchlike 5, directly at the rear end and with interposition of a piston cover 3' at the front end, acting as bearing support. At the rear end, a ball bearing or suchlike 6 is fitted between the outer shell and the extension of the piston.

Figure 3:
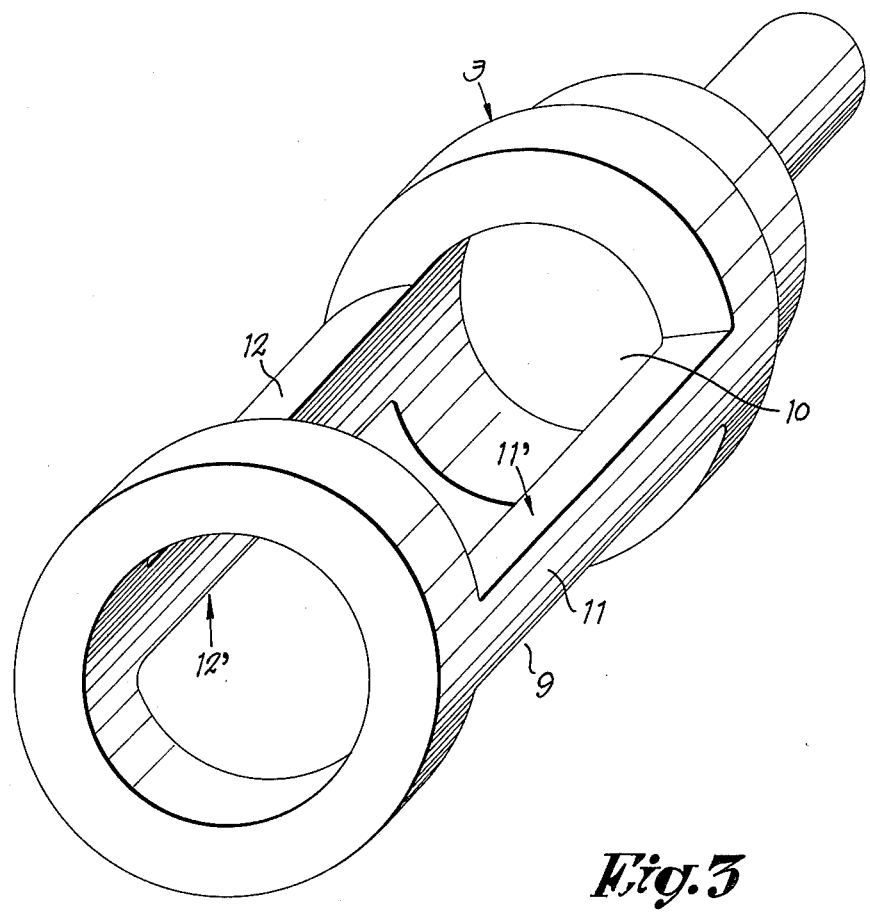
FIG. 3 is a schematic perspective view of the rotary piston of the engine of FIGS. 1 and 2, without seals.

Rotary piston 3 is provided with circular seals 7 on the inside and 8 on the outside which bear respectively against the internal hollow body 2 and against the outer shell 1. As far as the rotary piston is concerned, it is provided in its outer wall (FIG. 3) with two cut-away portions or windows 9, 10, mutually spaced by longitudinal elements of the side wall, respectively 11, 12, of which one side surface, respectively 11',12', make up the active surfaces of the piston, i.e. the surfaces which will be in contact with the gasses during their phase of expansion. These longitudinal elements of the side wall are provided with longitudinal internal seals 7' and external seals 8' (see FIG. 2).

The internal chamber 2' which is formed by the hollow body 2 is a chamber which is pressurized by the combustion gas (air, for instance) or by the carburetted fuel mixture (air — petrol, for instance); this chamber axially encloses a camshaft 13 which is driven by and rotates at the same speed as rotary piston 3, camshaft which controls four inlet valves fitted in the hollow body, respectively the entrance valves 14, 14' and the restoring valves 15, 15' of air or carburetted fuel mixture. These valves connect with the chambers formed by windows 9, 10. Internal chamber 2' shall be made tight.

The outer shell has two inlet valves 16, 17 for air or carburetted fuel mixture and two exhaust valves 18, 19 for the burnt and expanded gasses, which also connect to chambers 9, 10. These valves are controlled by cams not shown in the drawings. Furthermore, the outer shell supports two swing valves 20, 21 (FIG. 2), mechanically controlled by the rotary piston itself — (mechanism not shown) and protruding into the cut-away portions of the piston. These swing valves or mobile cylinder heads 20, 21 are also provided with seals, not shown in FIGS. 1 and 2.

The hollow internal body 2 and the outer shell 1 are cooled by water circuits 22, 23.

In FIGS. 1 and 2 there appear internal valves 14 and 14', 15 and 15' as well as a camshaft 13. The existence of these valves and this camshaft facilitate the comprehension of the principle, but it is obviously possible to replace these "valves and camshaft" by a "distributor sleeve" provided with ports. The solution with internal ports is in fact mechanically more elegant, but nevertheless, in order to facilitate the comprehension of the principle, the valves and camshaft will be retained in the following explanation of the engine operation.

The various constituent elements of the rotary engine according to the invention having been described, the operation of the rotary piston will now be explained with reference to the succession of diagrams of FIGS. 4 to 7. Although the operating principle of the rotary engine according to the invention is totally different to that of the traditional four stroke engine, it is possible to find back the four strokes. In aforesaid Figures, an arrow showing the sense of rotation simultaneously indicates the instantaneous position of the rotary piston. In the following description, the angles are reckoned with respect to the vertical line, at its end near the top swing valve.

Figure 4:
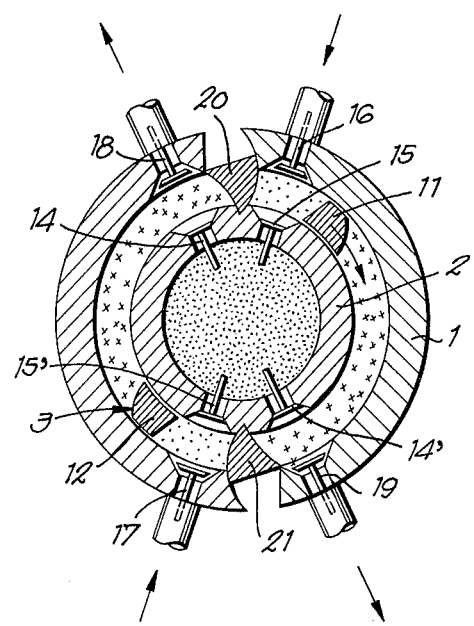
FIGS. 4 to 7 are schematic cross-sections showing the movement of the rotary piston.

In the diagram of FIG. 4, the rotary piston is 30° past its origin. The engine is supposed to have reached its normal running conditions, which means that it is admitted from the start that burnt and expanded gasses are present, which are represented in the diagram by small crosses.

The induction valves 16, 17 are open and the exhaust valves 18, 19 are also open. All valves in the internal chamber 2, 14, 14', 15, 15' are closed. The internal chamber 2 will have been pressurized, and let P be the pressure at present prevailing in this chamber (the procedure and the value of this pressurization will be described further on). The air or carburetted fuel gasses are represented by dots, the density of which symbolically indicated the pressure; the gasses in the internal chamber 2 being under pressure, the density of the dots is consequently greater.

In the course of its rotation up to 180°, the inlet valves being open, the piston creates a vacuum between internal chamber 2 and outer shell 1, vacuum which is filled by the gas (air, for instance) or by the carburetted fuel mixture. Moreover, as the exhaust valves are open, it is easy to understand that the exhaust gasses are evacuated by the rotary piston.

Figure 5:
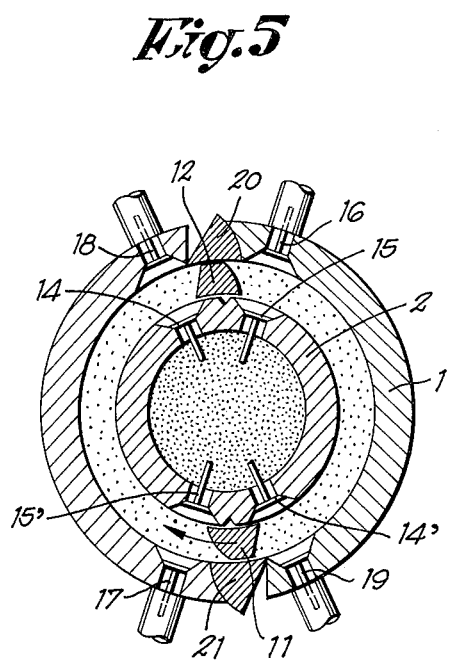

In the diagram of FIG. 5, the rotary piston has rotated by 180°, the swing valves 20, 21 having previously been lifted. The exhaust valves 18, 19 have closed, as well as inlet valves 16, 17. The burnt and expanded gasses have been evacuated and the entire free volume between internal chamber 2 and outer shell 1 is filled with air or with carburetted fuel mixture, which are at present approximately at atmospheric pressure. So far two charges of air or carburetted fuel gas have been sucked up. The pressure in the internal chamber still amounts to P.

Figure 6:
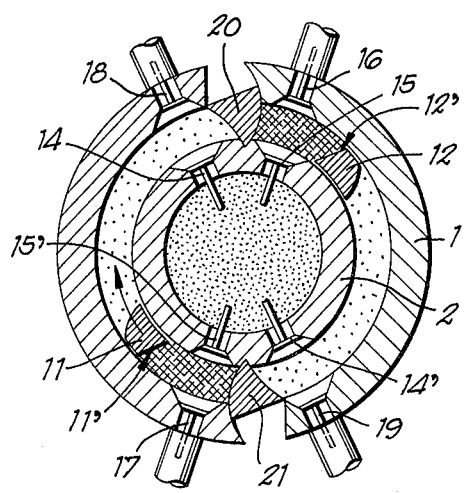

In the diagram of FIG. 6, after the closing of swing valves 20, 21, the rotary piston uncovers valves 15, 15' or so-called restoring valves; these valves have previously been opened by a few degrees, before the piston uncovers them completely (opening advance). The air or carburetted fuel gasses fill the empty spaces between aforesaid swing valves and active surfaces 11', 12' of the piston; these two volumes increase as the rotation of the piston continues, and the pressure in these volumes is theoretically the same as that in the internal chamber. In fact, if the volume of internal chamber 2 is markedly larger than the two volumes between the swing valves and the active surfaces of the piston, and if the valves are properly dimensioned to obtain a minimum loss of head, the pressure will vary only slightly in the variable spaces between the swing valves and the active surfaces of the rotary piston.

When the volumes of combustion or carburetted fuel gas between the two swing valves 20, 21 and the active surfaces 11' and 12' of the rotary piston will be sufficient (these volumes will have been determined by calculation) to assure a complete combustion of the fuel, valves 15, 15' will close. At that instant, in the case when the induced charges are of air, the injection of two charges of fuel will occur, injection which is regulated by an injection pump. The combustion is set off either by spark plugs, or as in the Diesel motor, i.e. by spontaneous combustion in accordance with the compression ratio. In the case when the induced charges are of carburetted fuel mixture, the explosion will be simply set of by means of spark plugs.

The diagram of FIG. 6 shows the beginning of the combustion. The area shaded in squares represents the ignited combustion gas/fuel mixture. The expansions due to the increase in enthalpy of the gasses produce the first power stroke of the rotary piston and, by its rotation, the piston compresses the two new charges of combustion or carburetted fuel gas.

The internal chamber 2 loses some pressure which is but a slight fraction of the value of pressure P. Say that $\Delta p$ is this loss of pressure in the internal chamber, so that in the diagram of FIG. 6 the pressure in the internal chamber amounts to $P - \Delta p$.

Figure 7:
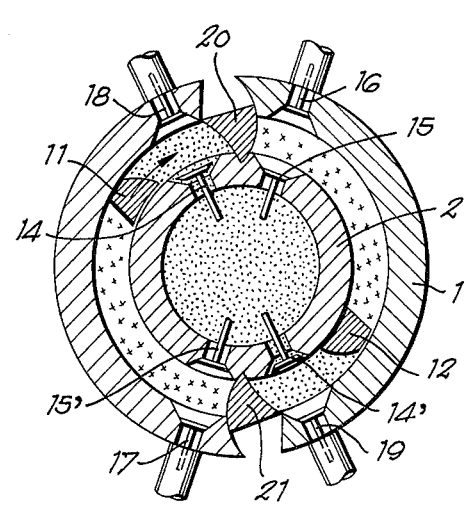

The diagram of FIG. 7 illustrates the rotary piston towards the end of the expansions, as well as towards the end of the compressions of air or carburetted fuel gas. At that instant (after 320° of rotation of the rotary piston), the inlet valves to the internal chamber 2 open. The compressed charges of air or fuel mixture are then pressed into aforesaid inner chamber, the pressure of which is thereby increased by $\Delta P$, so that the pressure in the inner chamber now amounts to $P - \Delta p + \Delta p = p$, which is the pressure which was initially prevailing in the inner chamber.

Subsequent to the diagram of FIG. 7, we are back again in the position symbolically shown in diagram of FIG. 4, so that a new cycle can start. It should be noted that two combustions occur per revolution of the rotary piston. Two charges of air or carburetted fuel gas have also been induced per revolution of the rotary piston.

In what has been said up till now, it was presumed that the pressure in the inner chamber varied between $P$ and $P - \Delta p$. The principle shows that this pressure is kept up by the engine itself in the course of the described cycles.

Initially, with the engine at stand-still, the pressure in the inner chamber equals atmospheric pressure.

In all the previous diagrams, it has been presumed that normal running conditions had been reached. It was presumed that the pressure prevailing in the inner chamber was "P". This pressure "P" corresponds namely to the pressure at the end of the compression cycle.

The setting up of this pressure in the inner chamber will now be investigated. In fact, before the engine is started, the pressure in the inner chamber amounts to atmospheric pressure. We are now going to examine the procedure of automatic pressurization of the inner chamber, and for this purpose we make the following definitions:

$V_{ch}$: volume of the inner chamber
$\tau$ : the compression ratio
$V_3$ : the volumes at the end of compression
we also adopt:

$V_{ch} = kV_3$

The symbols used need some clarification:

$V_{ch}$ is the internal volume of the inner chamber, i.e. the volume where the compressed gasses are stored.

$\tau$ is the compression ratio, which determines the opening of valves 14 and 14'. The opening time of valves 14 and 14' will be the same as that of valves 15 and 15'. The compression ratio also determines the opening time of valves 14, 14' and 15, 15', and such for a given speed of rotation. Hence we see that the compression ratio also determines the closing instant of valves 15 and 15'.

$V_3$ are the volumes at the end of compression. In normal running conditions, when in the course of the compression phases the pressure of the gas enclosed between the piston and the swing valves approaches the pressure in the inner chamber, valves 14 and 14' open. In the example being handled, the volume $V_3$ is the sum of two masses of combustion or carburetted fuel gas compressed between the piston and the swing valves, just previous to the opening of valves 14 and 14'. Volume $V_3$ can be compared to the volume of gasses at the end of the compression stroke in the conventional piston engines.

$k$ is the ratio between the volume of the inner chamber and the volume at the end of compression.

In order to determine the procedure for pressurizing the inner chamber, we shall select for instance:

$\tau = 8$ and $k = 3$ i.e.

$V_{ch} = 3 V_3$

Figure 8:
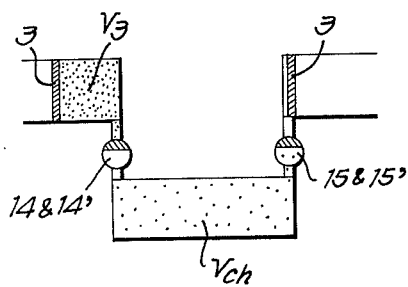
FIGS. 8 to 12 are idealized diagrams for the process of transfer of air or carburetted fuel mixture into the pressure chamber.

The transfer of compressed gas is shown idealistically by the diagrams of FIGS. 8 to 12:

In the diagram of FIG. 8, the gaseous masses are at the end of compression, valves 14 and 14' are about to open, 15 and 15' are closed.

Figure 9:
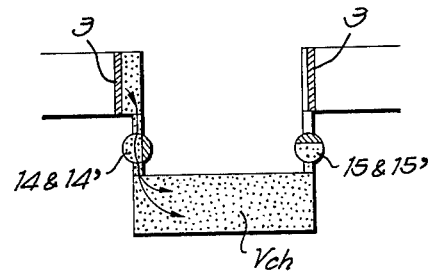

In the diagram of FIG. 9, valves 14 and 14' are open, the compressed gas is transferred into the inner chamber; valves 15 and 15' are closed.

Figure 10:
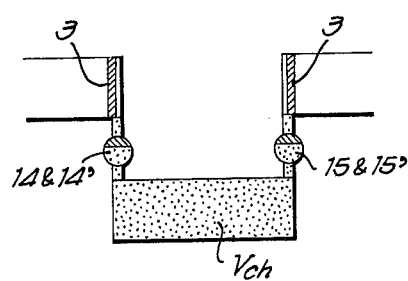

In the diagram of FIG. 10, the first transfer is now completed, valves 14, 14' and 15, 15' are closed.

Figure 11:
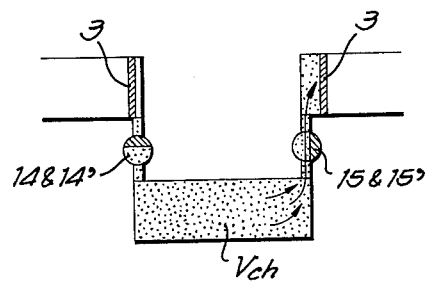

In the diagram of FIG. 11, valves 14, 14' are closed, whereas valves 15 and 15' are open. The transfer starts in the other direction.

Figure 12:
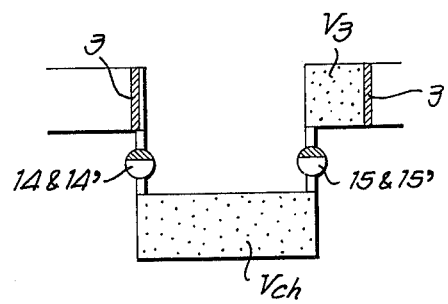

In the diagram of FIG. 12, the transfer "reverse direction" is at present completed, valves 14, 14' and 15, 15' are closed.

The losses of head will not be taken into consideration in this procedure for pressurizing the inner chamber.

Let us consider, as initial state that $P = P$ atm in the inner chamber, and examine the development in the course of the first revolution of the rotary piston:

Diagram FIG. 8, the thermodynamics of gasses prove that the pressure in volume $V_3$ amounts to $p = p_o \tau^\gamma = 1 \times 8^{1.4} = 18.38$ kg/cm² in which $p_o$: initial pressure in the adiabatic compression transformation. In the present case, we shall consider $p_o = p$ atm $\simeq 1$ kg/cm².

Diagram FIG. 9, the pressure increases in the inner chamber.

Diagram FIG. 10, the pressure in the inner chamber amounts to approximately $p_{ch} = (18.38/3) = 6.126$ kg/cm², since $V_{ch} = 3 V_3$ (as first approximation it will be presumed that the gas temperature is constant)

Diagram FIG. 11, the transfer in reverse direction starts, whereby the pressure in the inner chamber drops.

Diagram FIG. 12, the pressure in the inner chamber amounts to $p_{ch} = \frac{3}{4} 6.126 = 4.595$ kg/cm² second revolution:
Diagram FIG. 8, $p_{ch} = 4.595$ kg/cm²
Diagram FIG. 9, $p_{ch} > 4.595$ kg/cm²
Diagram FIG. 10, $p_{ch} = 4.595 + 6.126 = 10.721$ kg/cm²
Diagram FIG. 12, $p_{ch} = \frac{3}{4} 10.721 = 8.040$ kg/cm²
third revolution:
Diagram FIG. 8, $p_{ch} = 8.040$ kg/cm²
Diagram FIG. 10, $p_{ch} = 8.040 + 6.126 = 14.166$ kg/cm²
Diagram FIG. 12, $p_{ch} = \frac{3}{4} 14.166 = 10.625$ kg/cm²
fourth revolution:
Diagram FIG. 8, $p_{ch} = 10.625$ kg/cm²
Diagram FIG. 10, $p_{ch} = 10.625 + 6.126 = 16.751$ kg/cm²
Diagram FIG. 12, $p_{ch} = \frac{3}{4} 16.751 = 12.563$ kg/cm²
twentieth revolution:
Diagram FIG. 8, $p_{ch} = 18.300$ kg/cm²
Diagram FIG. 10, $p_{ch} = 18.300 + 6.126 = 24.426$ kg/cm²
Diagram FIG. 12, $p_{ch} = \frac{3}{4} 24.426 = 18.319$ kg/cm²

It can thus be seen that we are approaching the limits of the pressure in the inner chamber; indeed, the pressure in the inner chamber varies: between 18.38 kg/cm² and 18.38 + 6.126 kg/cm², whereby these values are the limits for an infinite number of revolutions of the piston, and we can conclude to the following law:

$p_o \tau^\gamma \leq p_{ch} \leq p_o \tau^\gamma + (p_o \tau^\gamma / k)$ with $V_{ch} = k V_3$ if $p_o \simeq p$ atm $\simeq 1$ kg/cm²

$\tau^\gamma \leq p_{ch} \leq \tau^\gamma + (\tau^\gamma / k)$ the equality being reached for an infinite number of revolutions, but we notice that after twenty revolutions, when starting the engine, the pressures within the inner chamber are within 0.30% of their limit values.

It can also be seen that a higher value for "$k$" brings the limits given by the above formula closer together. namely: if $V_{ch} = 10 V_3 (k = 10)$ and $\tau = 8$ $8^{1.4} \leq p_{ch} \leq 8^{1.4} + (8^{1.4}/10)$ or $18.379 \leq p_{ch} \leq 20.217$ kg/cm²

In other words, the larger the volume of the inner chamber, as compared with the volume $V_3$, the slighter are the pressure variations in the inner chamber, in the course of normal running of the engine, and the longer it will take to pressurize the inner chamber. The pressurizing times of the inner chamber are in fact relatively short. We find indeed, that if the piston rotates at 600 rev/min. during its starting period, 2 seconds will be required in order to reach its pressure (within 0.3%, 20 revs.)

In the upper limit of the pressure ($\tau^\gamma + \tau^\gamma/k$), the term ($\tau^\gamma/k$) is precisely what has been defined as "$\Delta p$".

For the starting period it is also possible to raise the pressure in the inner chamber instantaneously by connecting to an auxiliary tank containing air or carburetted fuel mixture at an adequate pressure.

A rotary engine built according to the invention is of simple construction. All the main parts, such as the rotary piston, the inner chamber, the outer shell, the swing valves are bodies of revolution. Their fabrication requires no specialized machinery. The number of parts is moreover quite restricted.

The engine is always balanced. The stresses occur indeed simultaneously on the active surfaces of the rotary piston.

The engine has a great flexibility; as soon as combustion takes place, engine torque is available, and this engine torque depends exclusively upon the laws of the thermodynamics of gasses.

Whilst investigating the cycle, we have noticed that two explosions or combustions occur per revolution, which is the inverse of what happens in the conventional four stroke engine in which a single explosion occurs every two rotations of the crankshaft. The power for a given cubic capacity is forthwith multiplied by four. It is however possible with a rotary engine according to the invention to obtain greatly increased power, because the rotary piston may be provided with a large number of branches, and not merely two as shown in the drawings of FIGS. 1 to 7. The compression and expansion strokes being directly proportional to the diameter of the rotary piston; the greater this diameter, the larger the number of branches will be, whilst nevertheless preserving acceptable strokes for compressions and expansions. We can thus see that an engine with four branches will give rise to sixteen explosions in the course of two revolutions, and in a more general way, the number of explosions will be the square of the number of branches.

If we call:
$n_c$: number of combustions occurring in 2 revs
$n_b$: number of branches of the rotary piston we obtain the law:

$$n_c = (n_b)^2$$

The number of valves of the engine must also be examined. We have seen that a rotary engine with two branches requires $2 \times 4 = 8$ valves (or 4 valves + 4 ports) (the term valve being taken in the widest sense). This number is by no means exaggerated, because we also have 4 combustions every 2 revolutions. A conventional 4 stroke engine, in order to produce 4 combustions every 2 revolutions, requires 4 cylinders with two valves each, which also makes a total of 8 valves. Let us examine what the number of valves becomes when the number of branches of the piston increases. A piston with 3 branches will produce 9 combustions for 2 revolutions ($n_c = (n_b)^2$) and requires $2 \times 6 = 12$ valves (or 6 external valves + 6 internal ports). A piston with 4 branches causes 16 combustions per 2 revolutions and requires $2 \times 8 = 16$ valves (or 8 valves + 8 ports); for a piston with 5 branches, the number of valves is equal to 20 and 25 combustions are produced every 2 revolutions. It can be seen that the total number of valves becomes equal to the number of combustions during 2 revolutions for a number of branches equal to 4, and that it becomes less than the number of combustions per 2 revolutions when the number of branches is further increased. From the preceding, we can deduce the law which governs the number of valves and the number of branches.

Let $n_s$ be the total number of valves
$n_c$ be the number of combustions per 2 revs
$n_b$ the number of branches of the piston
we then have:

$$n_s = 4 n_b$$

or also, since $$n_c = (n_b)^2$$

$$n_s = 4\sqrt{n_c}$$

If we now compare with the conventional 4 stroke, we find that in the conventional 4 stroke the number of valves is equal to twice the number of cylinders, i.e. to twice the number of combustions produced every 2 revolutions. Let $n'_s$ be the number of valves in the conventional 4 stroke, we then have:

$$n'_s = 2 n_c$$

Now if we wish to make a comparison, $n_c$ must necessarily be at least equal to 4 ($n_b = 2$ is indeed the minimum); we then find that $$n_s \leq n'_s$$

whereby the equality is reached for $n_c = 4$ ($n_b = 2$). The preceding inequality increases with the number of branches. It should also be noted that for $$n_b \geq 4 \ (n_c \geq 16)$$

$$n_s \geq n_c$$

For a number of branches exceeding 4, the number of valves is smaller than the number of combustions produced during 2 revolutions. Such are the laws which govern the number of valves of the rotary engine according to the invention.

Figure 13:
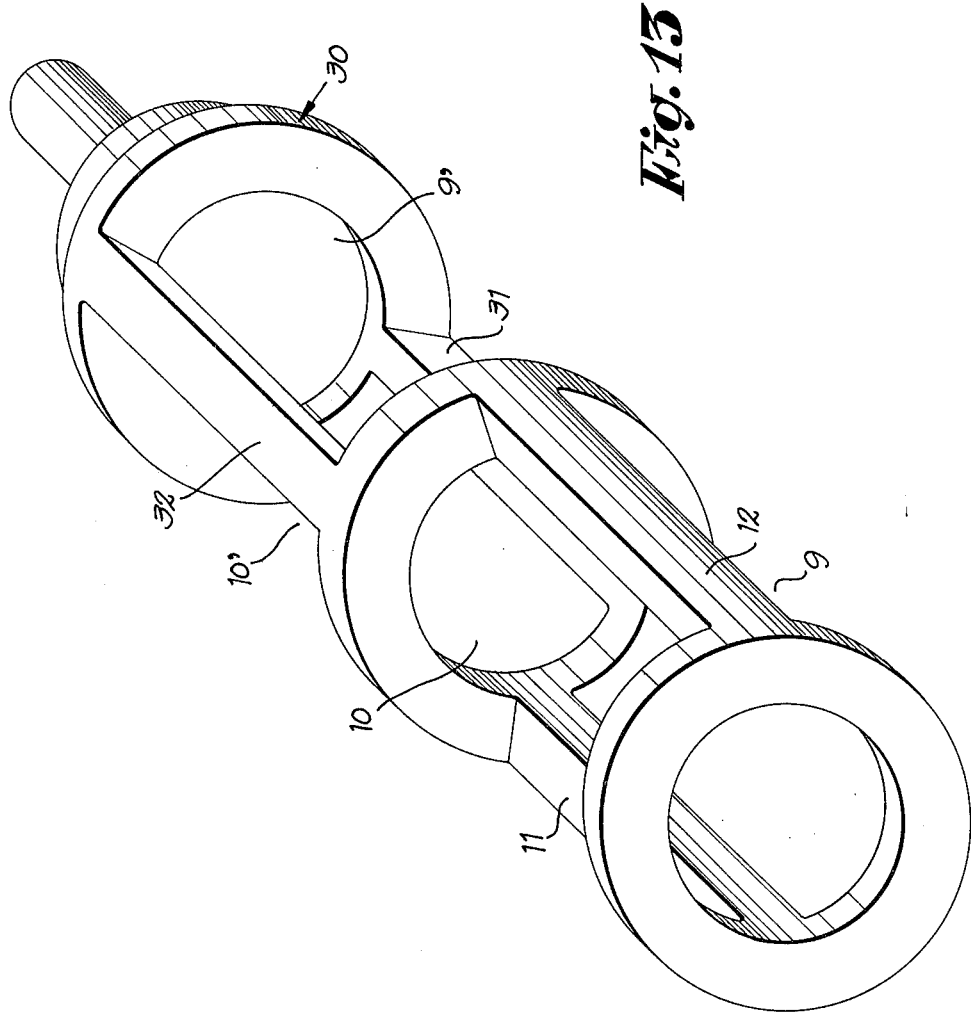
FIG. 13 is a schematic perspective view of an alternative form of embodiment of the rotary piston.

On the other hand, it is possible further to increase the power of the rotary engine and to assure a greater regularity of the engine torque and consequently to reduce the flywheel mass, by fabricating the piston to be double, treble, etc. In FIG. 13, a schematic perspective view is shown of a double piston 30, which means that in this piston the windows 9' and 10' of one half of the piston are shifted by 90° with respect to the windows 9, 10 of the other half of the piston; the same applies of course to branches 31, 32 with respect to branches 11, 12.

It remains understood, that it would not be going beyond the scope of the invention to replace one or other element by some equivalent. In this respect, the separating mechanism obtained by the swing valves may be constructed differently, and all mechanisms which finally perform the same function as the swing valve are acceptable. Similarly, the inlets and the exhausts could be effected by means of ports.

By eliminating certain elements, the engine may be converted to a compressor of fluids.

The alterations to be carried out to this effect in FIGS. 1, 2, 4 to 7 are the following: valves 18 and 19 are eliminated; valves 16 and 17 are replaced in their locations by ports 43 and 44 (see FIGS. 14 to 18), which being constantly open are called inlet ports for the fluid to be compressed; valves 15 and 15', the so-called restitution valves, are eliminated; valves 14 and 14' remain or are replaced by a sleeve system 40 provided with ports 41 and 42, sleeve which is integral with the piston and rotates with the latter. The inner chamber 2, which is motionless, is also provided with two ports 41' and 42'. The compressed fluid is evacuated axially through a channel at the end near ball bearing 5 (FIG. 1) (this outlet channel has not been shown in any of the drawings).

Figure 14:
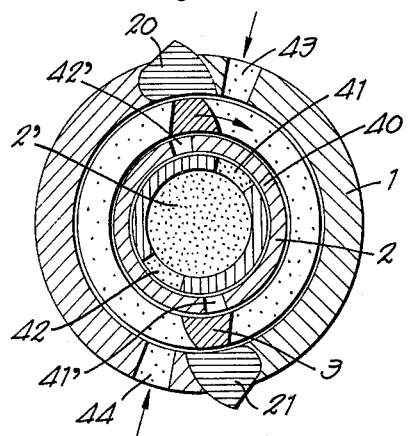
FIGS. 14 to 18 are cross-sections corresponding to those of FIGS. 4 to 7, but relating to a rotary compressor.

The cycle of the compressor appears as follows, whereby it is presumed that normal running conditions have been reached. In FIG. 14, piston 3 is in the origin of its rotation; swing valves 20 and 21 are lifted, the space between the outer shell 1 and the inner hollow body 2 is filled with fluid at a pressure close to atmospheric pressure, providing the feed pressure of the compressor is atmospheric pressure.

Figure 15:
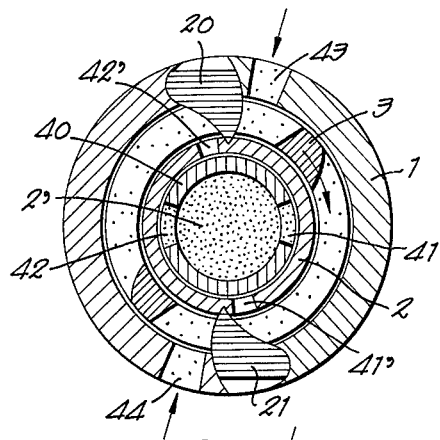

In FIG. 15, the piston is 30° past its origine, the compressions as well as the inductions have started.

Figure 16:
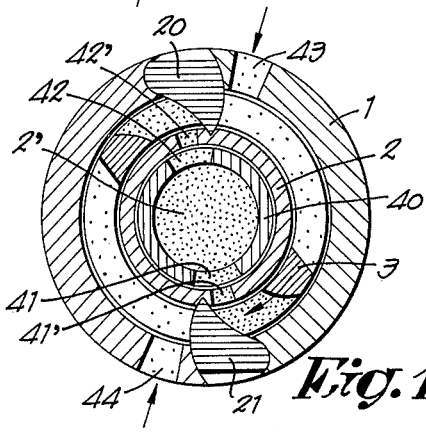

In FIG. 16 the inductions of fluid are practically completed.

Towards the end of the compressions, ports 41 and 41' as well as 42 and 42' communicate, so that the compressed charges are sent into inner chamber 2'.

Figure 17:
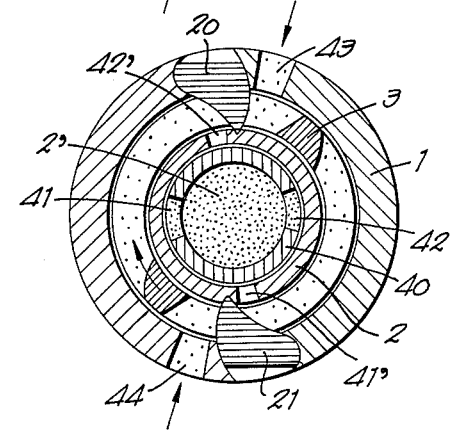

FIG. 17 is identical to FIG. 15, the cycle starts over again.

Figure 18:
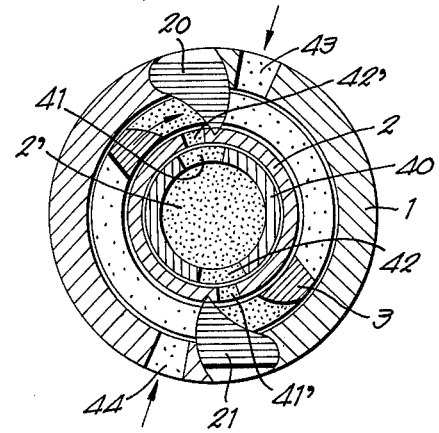

It will be seen that the cycle of the compressor is completed after one half revolution of rotary piston 3. In FIG. 18, which is identical to FIG. 16, piston 3 has practically completed an entire revolution.

It will be seen that 4 inductions and 4 compressions have been performed in the course of one revolution of the piston.

As in the case of the engine, laws can be deduced for the increase of the number of piston branches.

If we call:

$n_c$: the number of compressions performed in 1 revolution of the rotary piston. (for the engine $n_c$ stood for the number of combustions and was related to 2 revolutions of the rotary piston).

$n_b$: the number of branches of the rotary piston.

we then have:

$$n_c = (n_b)^2$$

Consequently, a compressor with 4 branches performs 16 inductions and 16 compressions for one revolution of the rotary piston.

On the other hand, it will be seen that only internal valves 14 and 14' (FIGS. 1 to 7) or the equivalent ports 41 and 42 remain.

Consequently, if $n_s$ is the number of internal valves or internal ports, we have:

$$n_s = n_b$$

Such are the laws which govern the number of internal valves or ports of the rotary compressor according to the invention.

What I claim is:

1. Rotary internal combustion engine comprising: a stationary cylindrical outer casing; a stationary closed cylindrical inner casing within said outer casing and coaxial therewith; at least two interconnected piston means, rotatably mounted around said inner casing, in gas-tight contact with said inner and outer casings; an output shaft connected to said piston means, at least two swing valves pivotally mounted on said outer casing and retractable, from a position in which they gas-tightly engage said inner casing, to a position in said outer casing and vice versa; fuel supply means for directing fuel to first inlet valve means in said outer casing; exhaust valve means in said outer casing to exhaust spent gases from said engine; second inlet and outlet valve means in said inner casing communicating with the space between said casings, said inner casing forming a single pressure chamber; and means for opening and closing said valve means in timed relation to rotation of said piston whereby gas is drawn in through said first inlet valve means, compressed between a piston and one side of a swing valve then discharged into said chamber through said second inlet valve means then withdrawn through said second outlet valve means on the other side of said swing valve, the pressure within said chamber pulsing between a value $P$ and $P - \Delta p$, $\Delta p$ being but a fraction of $P$.

2. Rotary engine according to claim 1, wherein said valve means are so located and operated that, per revolution, each piston means forces a given weight of air, respectively of an air-fuel mixture, into said chamber and that a same weight of air or air-fuel mixture is restored by said chamber behind said piston means, between the latter and the corresponding swing valve in unretracted position.

3. Rotary engine according to claim 1, wherein the number of valve means in the outer casing, the number of valve means in the inner casing and the number of swing valves are each equal to the number of piston means.

* * * * *